United States Patent
Yu et al.

(10) Patent No.: US 9,917,713 B2
(45) Date of Patent: Mar. 13, 2018

(54) OFFSET TUNABLE EDGE SLICER FOR SAMPLING PHASE AMPLITUDE MODULATION SIGNALS

(71) Applicant: Hewlett Packard Enterprise Development LP, Houston, TX (US)

(72) Inventors: Kunzhi Yu, Palo Alto, CA (US); Cheng Li, Palo Alto, CA (US); Marco Fiorentino, Palo Alto, CA (US); Raymond G. Beausoleil, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/139,779

(22) Filed: Apr. 27, 2016

(65) Prior Publication Data

US 2017/0317865 A1  Nov. 2, 2017

(51) Int. Cl.
  *H03D 1/00*  (2006.01)
  *H04L 27/22*  (2006.01)
  *H04L 27/233*  (2006.01)
  *H04L 25/06*  (2006.01)

(52) U.S. Cl.
  CPC ........ *H04L 27/223* (2013.01); *H04L 27/2338* (2013.01); *H04L 25/066* (2013.01); *H04L 25/069* (2013.01)

(58) Field of Classification Search
  CPC ..... H03L 7/091; H04L 25/066; H04L 25/069; H04L 7/033; H04L 25/34
  USPC .......................................... 375/287, 294, 353
  See application file for complete search history.

(56) References Cited

U.S. PATENT DOCUMENTS

| | | | |
|---|---|---|---|
| 7,356,095 B2 | 4/2008 | Dagdeviren et al. | |
| 8,958,501 B2 | 2/2015 | Nazemi et al. | |
| 2002/0122504 A1* | 9/2002 | Payne | H04L 25/061 375/317 |
| 2004/0141567 A1* | 7/2004 | Yang | H03L 7/087 375/287 |
| 2015/0180642 A1 | 6/2015 | Hsieh et al. | |

OTHER PUBLICATIONS

Tektronix, "PAM4 Signaling in High Speed Serial Technology: Test, Analysis, and Debug," (Web Page), Application Note, Oct. 6, 2015, 28 pages, http://www.tek.com/dl/55W_6027.

* cited by examiner

*Primary Examiner* — Leila Malek
(74) *Attorney, Agent, or Firm* — Wall and Tong, LLP

(57) ABSTRACT

In one example, an apparatus includes an offset tunable edge slicer having an input to receive a pulse amplitude modulation signal. The offset tunable edge slicer also has a plurality of possible offset settings corresponding to a plurality of different reference voltages of the offset tunable edge slicer. A multiplexer has an output coupled to the input of the offset tunable edge slicer and an input to receive a control signal that selects one of the plurality of possible offset settings for the offset tunable edge slicer. A phase detector has an input coupled to an output of the offset tunable edge slicer.

12 Claims, 5 Drawing Sheets

OFFSET TUNABLE EDGE SLICER FOR SAMPLING PHASE AMPLITUDE MODULATION SIGNALS

STATEMENT OF GOVERNMENT INTEREST

This invention was made with Government support under Contract No. H98230-14-3-0011, awarded by Maryland Procurement Office. The Government has certain rights in the invention.

BACKGROUND

Various formats may be utilized for optical signal modulation in silicon photonics, including, return-to-zero (RZ) and non-return-to-zero (NRZ) on-off keying (OOK), RZ and NRZ differential phase shift keying (DPSK), quadrature phase shift keying (QPSK), and so forth. Advanced modulation formats such as four-level quadrature amplitude modulation (QAM-4), sixteen-level quadrature amplitude modulation (QAM-16), and four-level pulse amplitude modulation (PAM-4) formats, may also be utilized in complementary metal-oxide-semiconductor (CMOS) based integrated circuits for optical signal modulation. A goal of these advanced modulation formats is to increase the spectral efficiency, i.e., the information rate that can be transmitted over a given bandwidth, of a communication system.

DETAILED DESCRIPTION

In one example, the present disclosure describes a clock and data recover (CDR) circuit suitable for use in a four-level pulse-amplitude modulated (PAM-4) receiver. PAM-4 is a modulation technique in which a carrier is modulated with one of four distinct amplitude levels per symbol, which allows two bits of data to be transmitted per symbol interval (e.g., {00, 01, 11, 10}). To recover the clock transmitted in an incoming PAM-4 signal, the incoming PAM-4 signal is "sliced" three times, approximately in the middle of the symbol interval (e.g., based on an edge of a symbol period clock). The voltage of each slice of the incoming PAM-4 signal is then compared to a different respective reference voltage. A typical PAM-4 receiver utilizes separate edge slicers to perform each of these reference voltage comparisons, for a total of three edge slicers. The amount of circuitry dedicated to operating the three edge slicers consumes a great deal of power and also imposes greater loading capacitance demands on the receiver's front end circuit, which in turn decreases overall system bandwidth.

The present disclosure describes a clock and data recover (CDR) circuit for a PAM-4 receiver that includes an edge slicer bank containing a single offset tunable edge slicer that receives the incoming PAM-4 signal. An input of the single offset tunable edge slicer is coupled a multiplexer that selects, based on a control signal, the offset setting for the offset tunable edge slicer. The offset setting will determine the reference voltage (e.g., low, middle, or high symbol amplitude) for the offset tunable slicer, for the purposes of sampling the incoming PAM-4 signal. Using a single offset tunable edge slicer in combination with the multiplexer allows the CDR circuit to be simplified, thereby reducing power consumption and increasing system bandwidth. In particular, by varying the offset setting of the offset tunable edge slicer, all of the pertinent edge information can be sampled by a single slicer.

Figure 1:
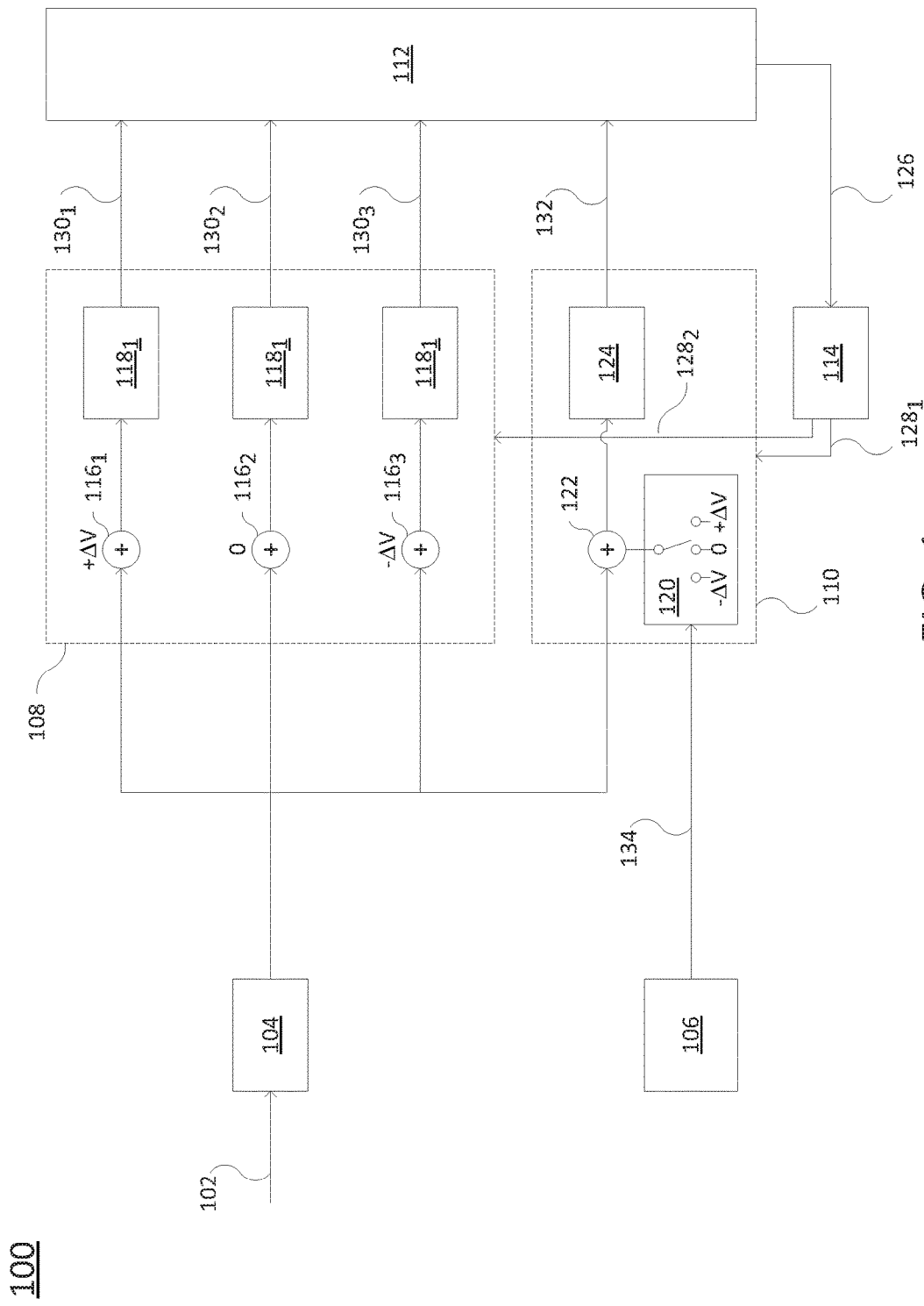
FIG. 1 is a schematic diagram illustrating a portion of one example of a four-level pulse amplitude modulation receiver.

FIG. 1 is a schematic diagram illustrating a portion of one example of a four-level pulse amplitude modulation (PAM-4) receiver 100. The receiver 100 is configured to recover data transmitted in an incoming PAM-4 signal 102. In one example, the receiver 100 includes a front end circuit 104, a switch signal generator 106, a data slicer bank 108, an edge slicer bank 110, a phase detector and counter circuit 112, and a phase interpolator 114.

The front end circuit 104 receives the incoming PAM-4 signal 102 and may perform pre-processing on the signal 102, including, for example, gain adjustment and/or signal amplification. The output of the front end circuit 104 is coupled to an input of the data slicer bank 108 and to an input of the edge slicer bank 110.

The data slicer bank 108 comprises three data slicers, where each data slicer comprises a voltage comparator $116_1$-$116_3$ (hereinafter collectively referred to as "voltage comparators 116") and a corresponding flip flop $118_1$-$118_3$ (hereinafter collectively referred to as "flip flops 118"). In one example, the reference voltage of each data slicer is set between a different pair of the four PAM-4 symbol amplitude levels, such that there is a "low" symbol amplitude level (e.g., $-\Delta V$), a "middle" symbol amplitude level (e.g., 0), and a "high" symbol amplitude level (e.g., $+\Delta V$). Each voltage comparator 116 compares the voltage of the incoming PAM-4 signal 102 to its respective reference voltage and generates either a first signal (when the incoming signal's voltage is greater than the reference voltage) or a second signal (when the incoming signal's voltage is less than the reference voltage) as an output. The output signal is then sampled by the corresponding flip flop 118. In one example, the flip flop 118 samples the output signal on the edges (e.g., the rising edges $128_2$) of a locally recovered sampling clock that are estimated to occur near the middle of the symbol intervals. The outputs $130_1$-$130_3$ of the flip flops 118 may be processed (e.g., by a decoder) to generate an estimate of the two-bit symbol that was transmitted in the incoming PAM-4 signal 102 (e.g., {00, 01, 11, 10}). The outputs $130_1$-$130_3$ of the flip flops 118 are coupled to inputs of the phase detector and counter circuit 112.

The edge slicer bank 110 comprises a single edge slicer, where the single edge slicer comprises a multiplexer 120 (e.g., a three-to-one multiplexer), a voltage comparator 122, and a flip flop 124. In one example, the edge slicer is an offset tunable edge slicer having a plurality of offset settings. In this case, the offset setting of the edge slicer controls the symbol amplitude (e.g., low, middle, or high) of the edge slicer's reference voltage. For instance, if the multiplexer 120 selects the $+\Delta V$ setting, the output 132 of the flip flop 124 is the high eye edge information; if the multiplexer 120 selects the 0 setting, the output 132 of the flip flop 124 is the middle eye edge information; and if the multiplexer 120 selects the −ΔV setting, the output 132 of the flip flop 124 is the low eye edge information. The offset setting of the edge slicer also determines which data slicer's output 130₁- 130₃ will be processed by the phase detector and counter circuit 112 at a given time. The offset setting is controlled by the multiplexer 120 in response to a signal 134 received from the switch signal generator 106. In one example, the flip flop 124 samples the incoming PAM-4 signal 102 on the edges (e.g., the falling edges 128₁) of the sampling clock that are estimated to occur near the edges of the symbol intervals. The output 132 of the flip flop 124 is coupled to an input of the phase detector and counter circuit 112.

The phase detector and counter circuit 112 may be linear (e.g., provides magnitude and sign of sampling phase error) or non-linear (e.g., provides the sign of the sampling phase error, but not the magnitude). The phase detector and counter circuit 112 receives the output 130₁, 130₂, or 130₃ of the data slicer bank 108 and the output 132 edge slicer bank 110 and compares them to each other and to the previous bit of the incoming PAM-4 signal. Based on this comparison, the phase detector and counter circuit 112 generates an early/late signal that indicates whether the sampling clock is early or late in relation to the incoming PAM-4 signal. Once the early/late signal accumulates to a predefined setting number, the phase detector and counter circuit 112 generates a control signal 126. The output of the phase detector and counter circuit 112 is coupled to an input of the phase interpolator 114.

The phase interpolator 114 receives the control signal 126 from the phase detector and counter circuit 112, and, based on the control signal 126, adjusts the phase of the sampling clock so that the sampling clock will converge to the center of the data eye of the incoming PAM-4 signal 102. In one example, the phase interpolator 114 produces as output a sampling clock that is a weighted sum of two input clocks. In one example, the sampling clock is delivered to the edge slicer bank 110 on the falling edges 128₁ and to the data slicer bank 108 on the rising edges 128₂. The phase interpolator 114 may employ a code mapping technique that is either sinusoidal or linear.

Figure 2:
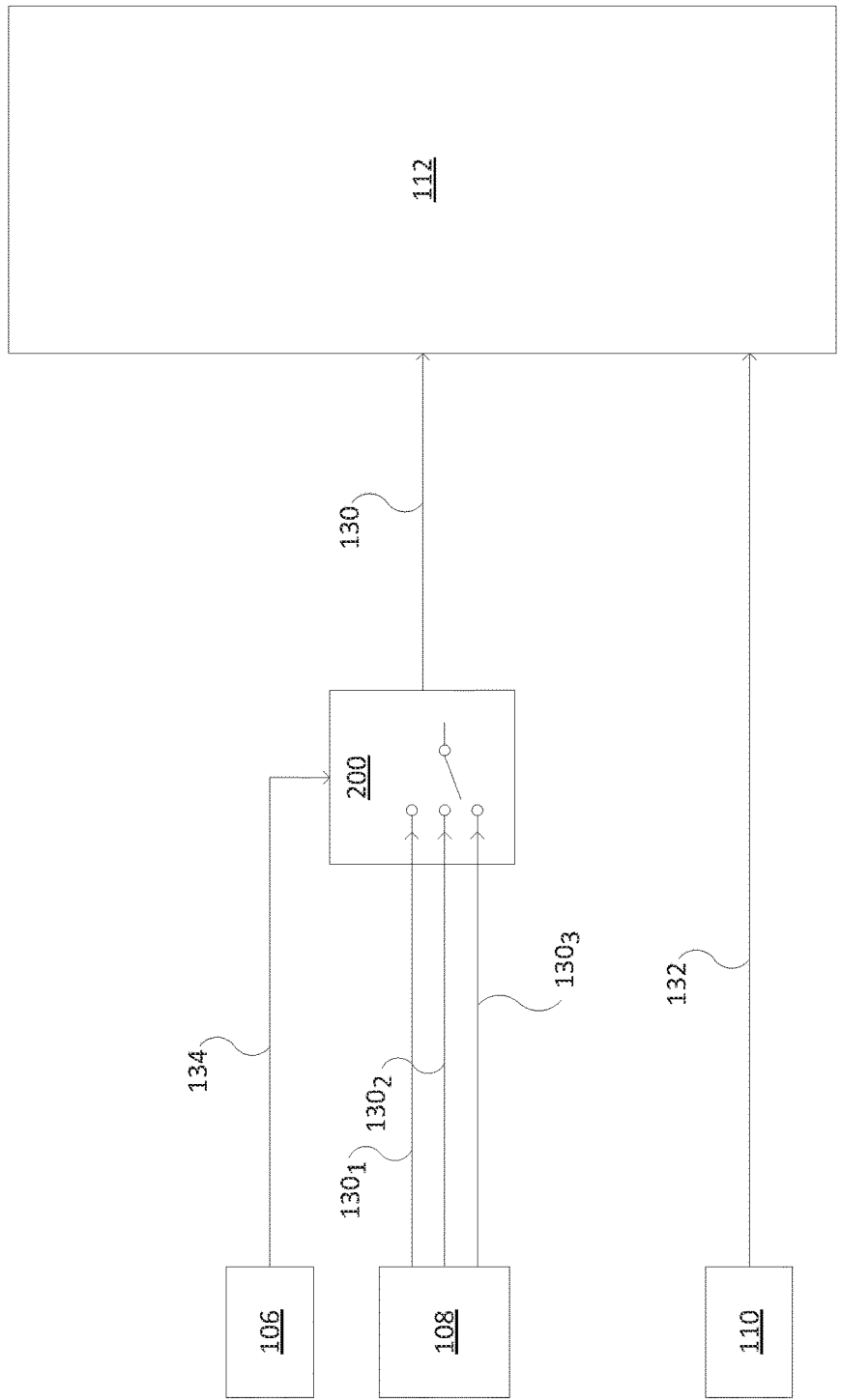
FIG. 2 is a simplified schematic diagram illustrating one example of the data slicer bank of the four-level pulse amplitude modulation receiver of FIG. 1 in more detail.

FIG. 2 is a simplified schematic diagram illustrating one example of the data slicer bank 108 of the PAM-4 receiver 100 of FIG. 1 in more detail. In this example, the outputs 130₁-130₃ of the data slicers are coupled to inputs of a multiplexer 200 (e.g., a three-to-one multiplexer).

The multiplexer 200 selects one output 130 from among the outputs 130₁-130₃ of the data slicer bank 108 to deliver to the phase detector and counter circuit 112. In one example, the switch signal generator 106 sends the signal 134 to the multiplexer 200 to instruct the multiplexer 200 as to which output 130₁-130₃ to select. In one example, the signal 134 is the same signal sent to the multiplexer 120 of the edge slicer bank 110. Thus, the multiplexer 200 selects the output 130₁-130₃ of the data slicer bank 108 that corresponds to the current output 132 of the edge slicer bank 110. As such, when the output 132 of the edge slicer bank 110 is the high eye edge information, the output 130 of the data slicer bank 108 will be the high eye data information; when the output 132 of the edge slicer bank 110 is the middle eye edge information, the output 130 of the data slicer bank 108 will be the middle eye data information; and the output 132 of the edge slicer bank 110 is the low eye edge information, the output 130 of the data slicer bank 108 will be the low eye data information. In one example, the switch signal generator's signal 134 is a manually controlled signal. In another example, the switch signal generator's signal 134 is an automatically generated periodic signal that generates the sample margin average of the three eye levels (i.e., high, middle, and low).

Figure 3:
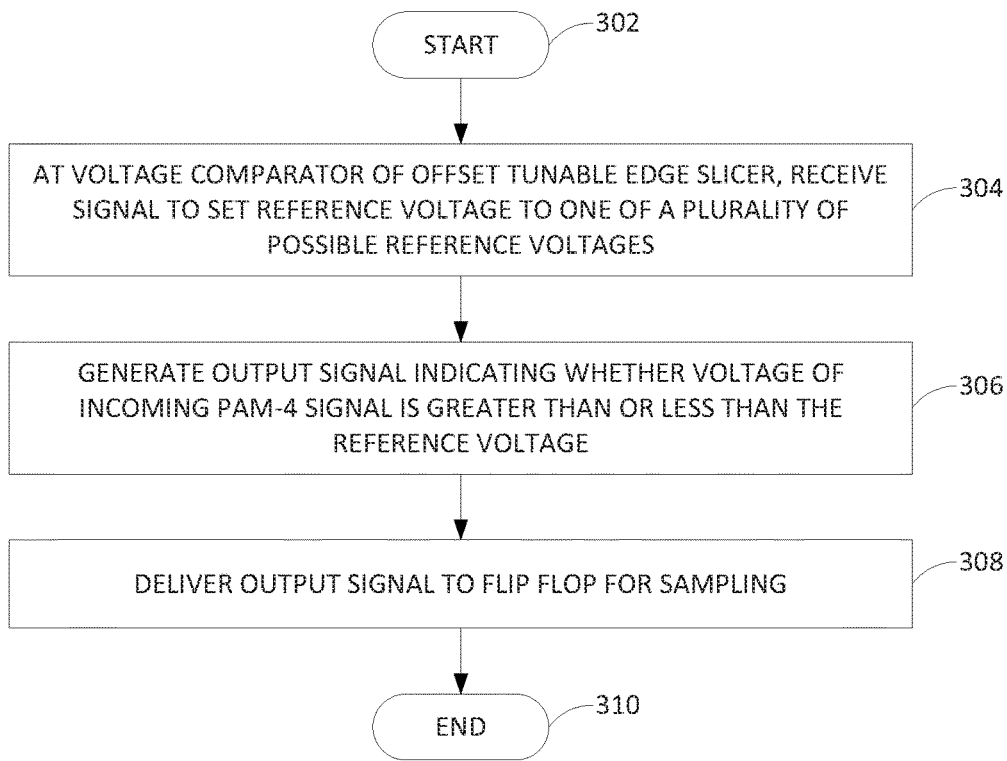
FIG. 3 illustrates a flowchart of an example method for performing clock and data recovery for an incoming four-level pulse amplitude modulation signal.

FIG. 3 illustrates a flowchart of an example method 300 for performing clock and data recovery for an incoming PAM-4 signal. The method 300 may be performed, for example, by any one of the components of the PAM-4 receiver 100 of FIGS. 1 and/or 2. Alternatively, or in addition, at least one of the blocks of the method 300 may be implemented by a computing device having a processor, a memory, and input/output devices as illustrated below in FIG. 5, specifically programmed to perform the blocks of the method, e.g., by operating as a control circuit for the PAM-4 receiver 100. Although a computing device may be specifically programmed to perform various blocks of the method 300, the method 300 will now be described in terms of an example where blocks of the method 300 are performed by a PAM-4 receiver, such as the PAM-4 receiver 100 of FIGS. 1 and/or 2.

The method 300 begins in block 302. In block 304, the voltage comparator 122 of the offset tunable edge slicer adjusts its reference voltage to one of a plurality of possible reference voltages, in response to a signal from the switch 120 instructing the voltage comparator 122 to set its reference voltage to a specified voltage. In one example, the reference voltage is set between one pair of the four PAM-4 symbol amplitude levels, where there is a "low" symbol amplitude level (e.g., −ΔV), a "middle" symbol amplitude level (e.g., 0), and a "high" symbol amplitude level (e.g., +ΔV).

In block 306, the voltage comparator 122 compares the voltage of an incoming PAM-4 signal (e.g., PAM-4 signal 102) to its reference voltage and generates an output signal indicating whether the incoming PAM-4 signal's voltage is greater than or less than the reference voltage.

In block 308, the voltage comparator delivers the output signal to the flip flop 124 for sampling.

The method 300 ends in block 310.

Figure 4:
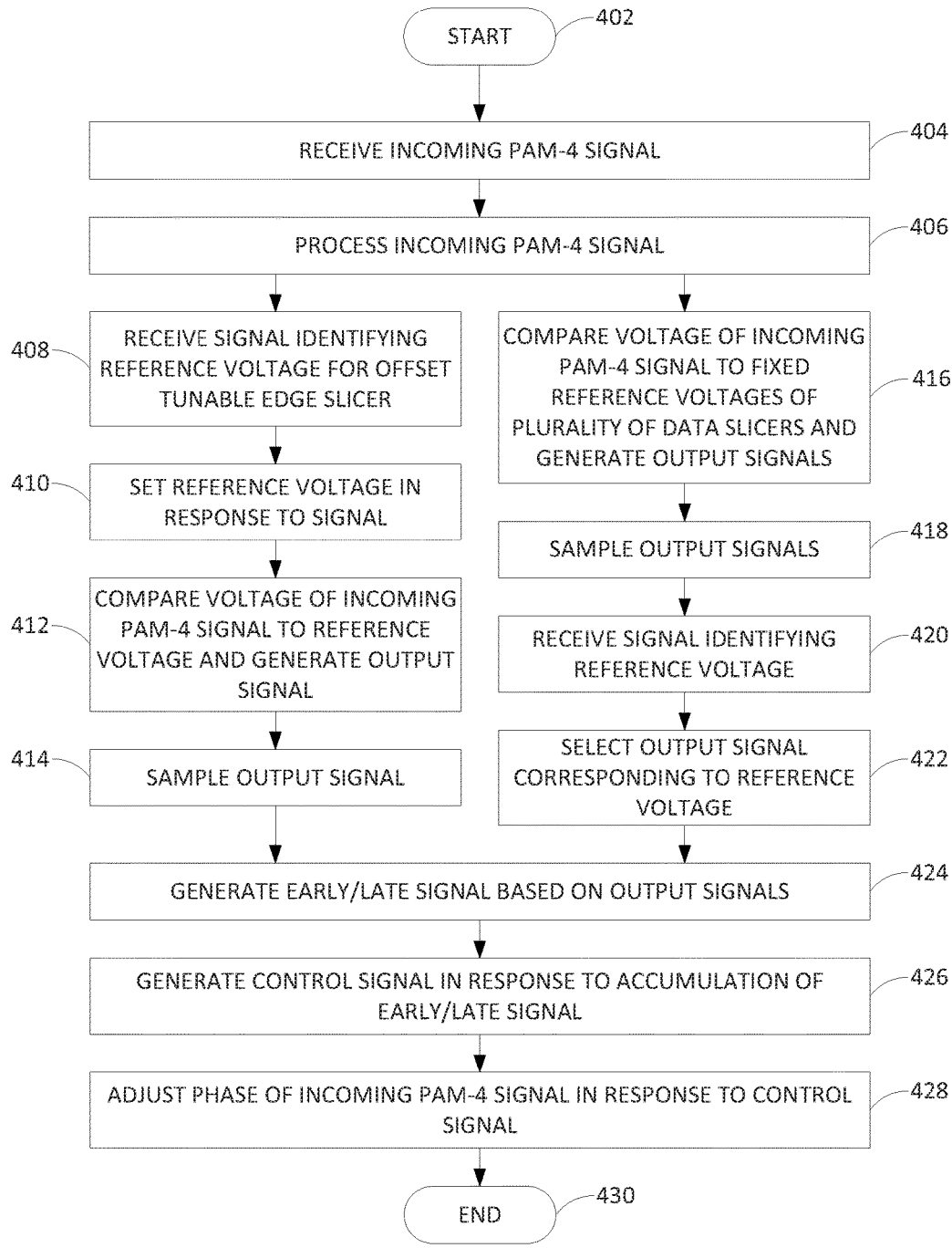
FIG. 4 illustrates a flowchart of another example method for performing clock and data recovery for an incoming four-level pulse amplitude modulation signal.

FIG. 4 illustrates a flowchart of another example method 400 for performing clock and data recovery for an incoming PAM-4 signal. The method 400 presents a more detailed example of the method 300, described in connection with FIG. 3. Thus, the method 400 may be performed by any one of the components of the PAM-4 receiver 100 of FIGS. 1 and/or 2. Alternatively, or in addition, at least one of the blocks of the method 400 may be implemented by a computing device having a processor, a memory, and input/output devices as illustrated below in FIG. 5, specifically programmed to perform the blocks of the method, e.g., by operating as a control circuit for the PAM-4 receiver 100. Although a computing device may be specifically programmed to perform various blocks of the method 400, the method 400 will now be described in terms of an example where blocks of the method 400 are performed by a PAM-4 receiver, such as the PAM-4 receiver 100 of FIGS. 1 and/or 2.

The method 400 begins in block 402. In block 404, an incoming PAM-4 signal 102 is received by the front end circuit 104.

In block 406, the front end circuit 104 processes the incoming PAM-4 signal 102 and delivers the incoming PAM-4 signal 102 to the data slicer bank 108 and to the edge slicer bank 110. In one example, the processing comprises gain adjustment and/or signal amplification.

In block 408, the multiplexer 120 receives a signal 134 from the switch signal generator 106. The signal 134 identifies a reference voltage for the voltage comparator 122 of the offset tunable edge slicer. The reference voltage is one of a plurality of possible reference voltages. In one example, the reference voltage is set between one pair of the four PAM-4 symbol amplitude levels, where there possible reference voltages include a "low" symbol amplitude level (e.g., $-\Delta V$), a "middle" symbol amplitude level (e.g., 0), and a "high" symbol amplitude level (e.g., $+\Delta V$).

In block 410, the voltage comparator 122 sets its reference voltage in response to a selection of one of the possible reference voltages by the multiplexer 120.

In block 412, the voltage comparator 122 compares the voltage of the incoming PAM-4 signal 102 to its reference voltage and generates an output signal indicating whether the incoming PAM-4 signal's voltage is greater than or less than the reference voltage.

In block 414, the flip flop 124 samples the voltage comparator's output signal and delivers the sampled signal to the phase detector and counter circuit 112.

In block 416, the voltage comparators 116 of the data slicer bank 108 each receive the incoming PAM-4 signal 102 and generate respective signals indicating whether the voltage of the incoming PAM-4 signal 102 is greater than or less than its respective reference voltage. In one example, the reference voltage of each of the voltage comparators 116 is set to a different fixed reference voltage. In one example, each of the reference voltages is set between one pair of the four PAM-4 symbol amplitude levels, where there possible reference voltages include a "low" symbol amplitude level (e.g., $-\Delta V$), a "middle" symbol amplitude level (e.g., 0), and a "high" symbol amplitude level (e.g., $+\Delta V$).

In block 418, each of the flip flops 118 samples the output signal of the corresponding voltage comparator 116 and delivers the sampled signal to the multiplexer 200.

In block 420, the multiplexer 200 receives the signal 134 from the switch signal generator 106.

In block 422, the multiplexer 200 selects the output $130_1$, $130_2$, or $130_3$ of one of the flip flops 118 in response to the signal 134 from the switch signal generator 106. In one example, the multiplexer 200 selects the output $130_1$, $130_2$, or $130_3$ of the flip flop 118 whose fixed reference voltage corresponds to the current reference voltage of the offset tunable edge slicer's voltage comparator 122. As such, when the output 132 of the edge slicer bank 110 is the high eye edge information, the output 130 of the data slicer bank 108 will be the high eye data information; when the output 132 of the edge slicer bank 110 is the middle eye edge information, the output 130 of the data slicer bank 108 will be the middle eye data information; and the output 132 of the edge slicer bank 110 is the low eye edge information, the output 130 of the data slicer bank 108 will be the low eye data information. The selected output 130 is delivered to the phase detector and counter circuit 112.

In block 424, the phase detector and counter circuit 112 generates an early/late signal, based on a comparison of the outputs 130 and 134 of the data slicer bank 108 and the edge slicer bank 110.

In block 426, the phase detector and counter circuit 112 generates a control signal in response to an accumulation of the early/late signal and delivers the control signal to the phase interpolator 114.

In block 428, the phase interpolator 114 adjusts the phase of the PAM-4 receiver's sampling clock in response to the control signal. In one example, the sampling clock's phase is adjusted so that it will converge to the center of the data eye of the incoming PAM-4 signal 102.

The method 400 ends in block 430.

It should be noted that although not explicitly specified, some of the blocks, functions, or operations of the methods 300 and 400 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIGS. 3 and 4 that recite a determining operation, or involve a decision, do not imply that both branches of the determining operation are practiced. In other words, one of the branches of the determining operation may not be performed, depending on the results of the determining operation.

Figure 5:
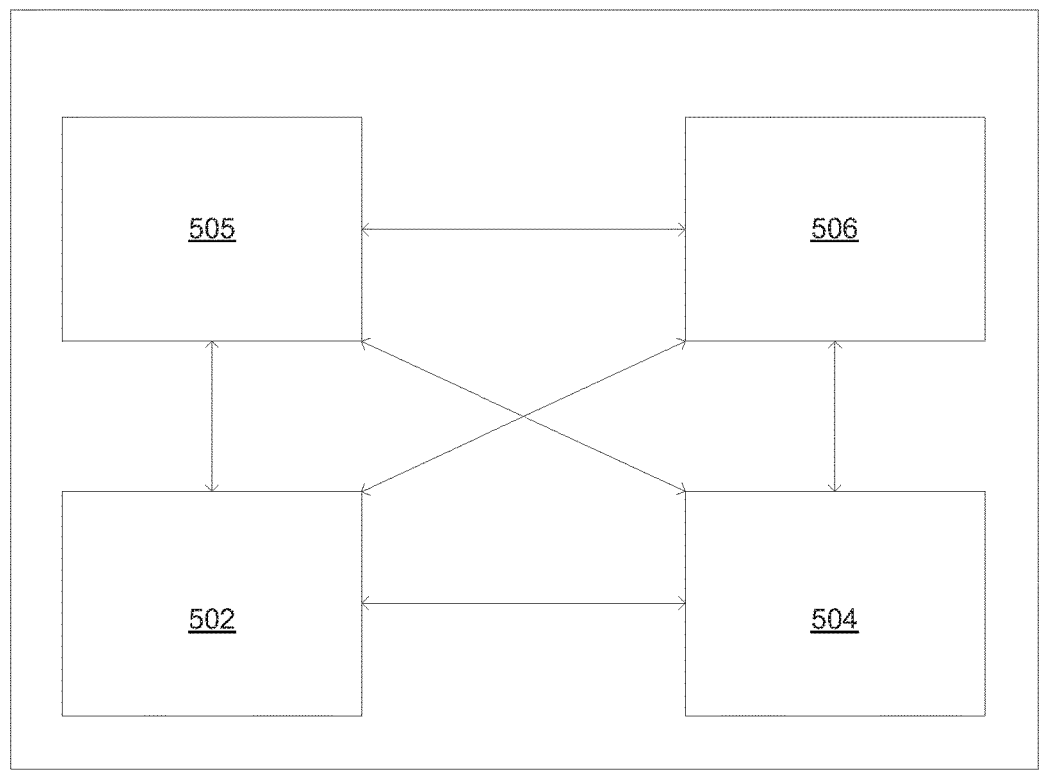
FIG. 5 depicts a high-level block diagram of a computing device suitable for use in performing the functions described herein.

FIG. 5 depicts a high-level block diagram of a computing device suitable for use in performing the functions described herein. As depicted in FIG. 5, the computing device 500 comprises a hardware processor element 502, e.g., a central processing unit (CPU), a microprocessor, or a multi-core processor, a memory 504, e.g., random access memory (RAM), a module 505 for performing clock and data recovery (CDR), and various input/output devices 506, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method (s) are implemented across multiple or parallel general-purpose computers, then the general-purpose computer of this figure is intended to represent each of those multiple general-purpose computers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed methods.

In one example, instructions and data for the present CDR module or process 505, e.g., machine readable instructions, can be loaded into memory 504 and executed by hardware processor element 502 to implement the blocks, functions, or operations as discussed above in connection with the example methods 300 and 400. Furthermore, when a hardware processor executes instructions to perform "operations," this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present CDR module 505, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, the computer-readable storage device may comprise any physical device or devices that provide the ability to store information such as data and/or instructions to be accessed by a processor or a computing device such as a computer or an application server.

In further examples, the present CDR module or process 505 does not reside on the same level of the computing device 500 as the hardware processor element 502 and memory 504, but instead resides on a level under the hardware processor element 502 and memory 504. Thus, FIG. 5 depicts the computing device 500 at a high level, and other configurations of the hardware processor element 502, memory 504, CDR module or process 505, and I/O devices, including hierarchical configurations, are possible.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

What is claimed is:

1. An apparatus, comprising:
   an offset tunable edge slicer having an input to receive a pulse amplitude modulation signal and having a plurality of possible offset settings corresponding to a plurality of different reference voltages of the offset tunable edge slicer;
   a first multiplexer having an output coupled to the input of the offset tunable edge slicer and having an input to receive a control signal that selects one of the plurality of possible offset settings for the offset tunable edge slicer;
   a phase detector having an input coupled to an output of the offset tunable edge slicer;
   a plurality of data slicers, each of the plurality of data slicers having an input to receive the pulse amplitude modulation signal and having a fixed reference voltage; and
   a second multiplexer having a plurality of inputs coupled to outputs of the plurality of data slicers, having an input to receive a control signal that selects one of the outputs of the plurality of data slicers, and having an output coupled to an input of the phase detector.

2. The apparatus of claim 1, wherein the pulse amplitude modulation signal is a four-level pulse amplitude modulation signal.

3. The apparatus of claim 2, wherein the plurality of possible offset settings includes at least three offset settings, and each offset setting of the at least three offset settings is set between one pair of symbol amplitude levels of the four-level pulse amplitude modulation signal.

4. The apparatus of claim 1, further comprising:
   a switch signal generator for generating the control signal for the first multiplexer and having an output coupled to the input of the first multiplexer.

5. A method, comprising:
   adjusting a reference voltage of an offset tunable edge slicer to one of a plurality of possible reference voltages, in response to a signal from a multiplexer;
   generating a first output signal indicating whether a voltage of an incoming pulse amplitude modulation signal is greater than or less than the reference voltage; and
   delivering the first output signal to a flip flop for sampling;
   generating a plurality of output signals by a plurality of data slicers each having a different fixed reference voltage, wherein each output signal of the plurality of output signals indicates whether the voltage of the incoming pulse amplitude modulation signal is greater than or less than a corresponding fixed reference voltage;
   selecting one of the plurality of output signals in response to a control signal; and
   delivering the one of the plurality of output signals to a phase detector.

6. The method of claim 5, wherein the pulse amplitude modulation signal is a four-level pulse amplitude modulation signal.

7. The method of claim 6, wherein the plurality of possible reference voltages includes at least three reference voltages, and each reference voltage of the at least three reference voltages is set between one pair of symbol amplitude levels of the four-level pulse amplitude modulation signal.

8. The method of claim 5, wherein the one of the plurality of output signals is generated by one of the plurality of data slicers having a fixed reference voltage that corresponds to the one of the plurality of possible reference voltages of the offset tunable edge slicer.

9. A non-transitory machine-readable storage medium encoded with instructions for instructing a processor to perform a method comprising the steps of:
   adjusting a reference voltage of an offset tunable edge slicer to one of a plurality of possible reference voltages, in response to a signal from a multiplexer;
   generating a first output signal indicating whether a voltage of an incoming pulse amplitude modulation signal is greater than or less than the reference voltage;
   delivering the first output signal to a flip flop for sampling;
   generating a plurality of output signals by a plurality of data slicers each having a different fixed reference voltage, wherein each output signal of the plurality of output signals indicates whether the voltage of the incoming pulse amplitude modulation signal is greater than or less than a corresponding fixed reference voltage;
   selecting one of the plurality of output signals in response to a control signal: and
   delivering the one of the plurality of output signals to a phase detector.

10. The non-transitory machine-readable storage medium of claim 9, wherein the pulse amplitude modulation signal is a four-level pulse amplitude modulation signal.

11. The non-transitory machine-readable storage medium of claim 10, wherein the plurality of possible reference voltages includes at least three reference voltages, and each reference voltage of the at least three reference voltages is set between one pair of symbol amplitude levels of the four-level pulse amplitude modulation signal.

12. The non-transitory machine-readable storage medium of claim 9, wherein the one of the plurality of output signals is generated by one of the plurality of data slicers having a fixed reference voltage that corresponds to the one of the plurality of possible reference voltages of the offset tunable edge slicer.

* * * * *